US009386880B2

(12) United States Patent
Friel, Sr. et al.

(10) Patent No.: US 9,386,880 B2
(45) Date of Patent: Jul. 12, 2016

(54) WAFFLE MAKER

(75) Inventors: Daniel D. Friel, Sr., Greenville, DE (US); Daniel E. Friel, Jr., Kennett Square, PA (US); H. William Busch, Jr., Wilmington, DE (US); James Fitzgerald, West Chester, PA (US); Terry Hall, Wilmington, DE (US)

(73) Assignee: EDGECRAFT CORPORATION

( * ) Notice: Subject to any disclaimer, the term of this patent is extended or adjusted under 35 U.S.C. 154(b) by 2351 days.

(21) Appl. No.: 11/367,074

(22) Filed: Mar. 3, 2006

(65) Prior Publication Data

US 2006/0201333 A1 Sep. 14, 2006

Related U.S. Application Data

(60) Provisional application No. 60/660,358, filed on Mar. 10, 2005.

(51) Int. Cl.
*A47J 37/06* (2006.01)
*A47J 27/62* (2006.01)
*H05B 1/02* (2006.01)
*G05D 23/19* (2006.01)

(52) U.S. Cl.
CPC ......... *A47J 37/0611* (2013.01); *G05D 23/1951* (2013.01)

(58) Field of Classification Search
CPC .............. A47J 37/0611; A47J 37/0814; A47J 37/0821; G05D 23/1951; F24C 14/02; F24C 7/08; F24C 15/106; H05B 3/68; H05B 3/746; G01K 3/04; G01K 7/42; G08B 17/06
USPC ........... 99/326–333, 352–355, 348, 337–340, 99/372–384, 385–393, 400, 401, 426–427, 99/444–450, 329 R; 219/521–524, 525, 219/492, 412, 413, 414, 443.1, 448.11, 219/448.12; 426/520–523; 374/102, 103, 374/107; 340/589
See application file for complete search history.

(56) References Cited

U.S. PATENT DOCUMENTS

| 2,325,551 | A | * | 7/1943 | Scharf | 99/329 R |
| 2,936,697 | A | * | 5/1960 | Kueser | 99/331 |
| 3,943,332 | A | * | 3/1976 | Marsh | 219/520 |
| 4,046,924 | A | * | 9/1977 | Tanguy | 426/502 |
| 4,476,379 | A | * | 10/1984 | Andrizzi | 219/524 |
| 4,493,981 | A | * | 1/1985 | Payne | 219/448.12 |
| 4,730,101 | A | | 3/1988 | Mahon | |

(Continued)

FOREIGN PATENT DOCUMENTS

WO    WO2005/084502    9/2005

OTHER PUBLICATIONS

European Search Report for PCT/US2006008034, dated Sep. 25, 2013.

*Primary Examiner* — Dana Ross
*Assistant Examiner* — Hemant Mathew
(74) *Attorney, Agent, or Firm* — Drinker Biddle & Reath LLP

(57) ABSTRACT

A waffle maker has upper and lower baking plates each of which is powered with at lease one heating element for baking waffle. A power control unit responds to a temperature sensing unit to control power applied to the heaters and to maintain the heating plates both before and after each baking cycle at a manually pre-selected temperature. A manually adjustable timer controls the duration of the baking cycle.

15 Claims, 7 Drawing Sheets

(56) References Cited

U.S. PATENT DOCUMENTS

| | | | |
|---|---|---|---|
| 4,829,390 A * | 5/1989 | Simon | 361/49 |
| 4,948,950 A * | 8/1990 | Rae | 219/497 |
| 5,636,564 A | 6/1997 | Weiss | |
| 5,937,742 A | 8/1999 | Steeb | |
| 6,079,321 A * | 6/2000 | Harter et al. | 99/349 |
| 6,321,639 B1 * | 11/2001 | Misceo | 99/332 |
| 6,427,581 B1 * | 8/2002 | Wu | 99/332 |
| 6,734,403 B2 * | 5/2004 | Baker et al. | 219/486 |
| 2001/0032546 A1 * | 10/2001 | Sharpe | 99/331 |
| 2001/0042448 A1 * | 11/2001 | Menektchiev et al. | 99/372 |
| 2003/0044312 A1 * | 3/2003 | Takano | 422/26 |
| 2003/0116557 A1 * | 6/2003 | Graff | 219/492 |
| 2004/0123744 A1 * | 7/2004 | Bobo | 99/374 |

* cited by examiner

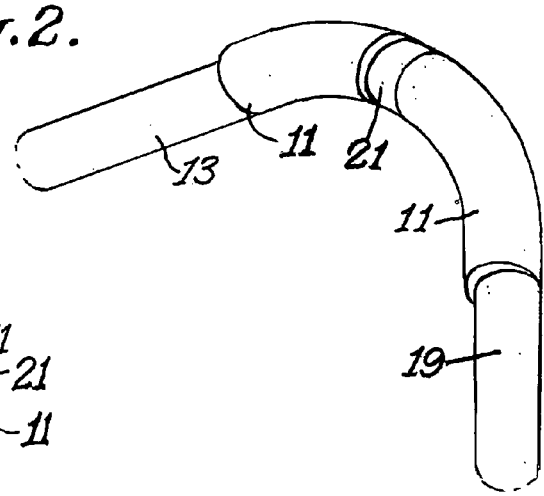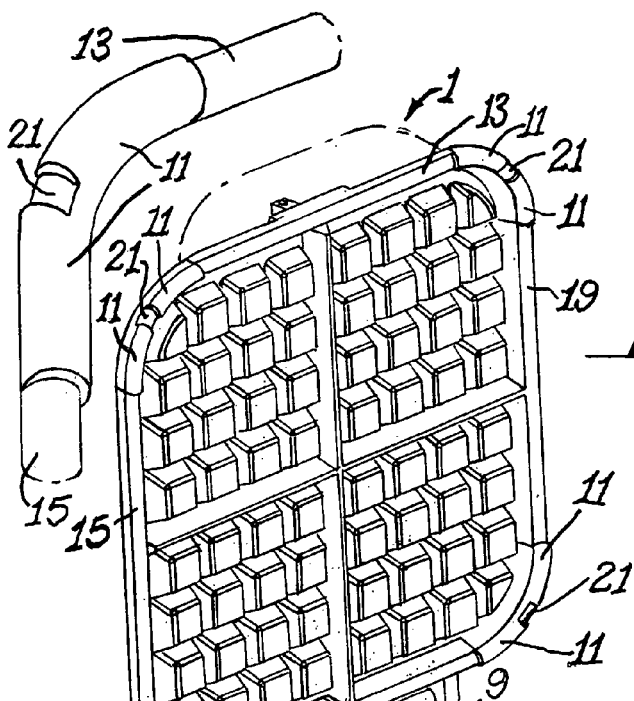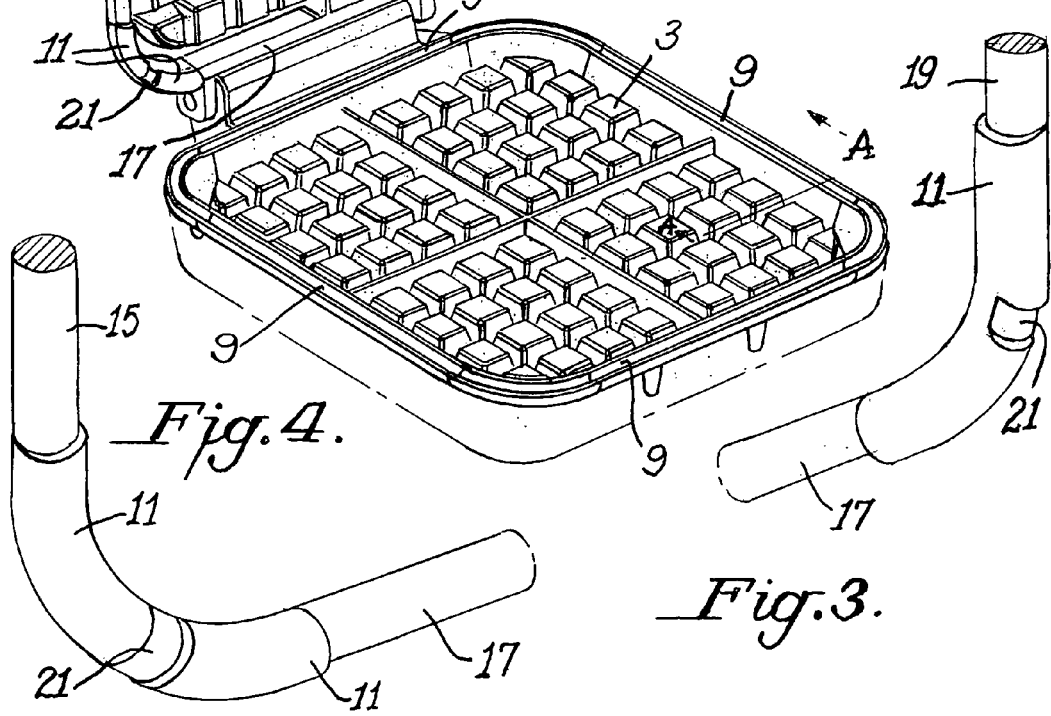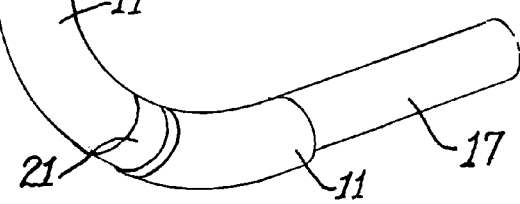

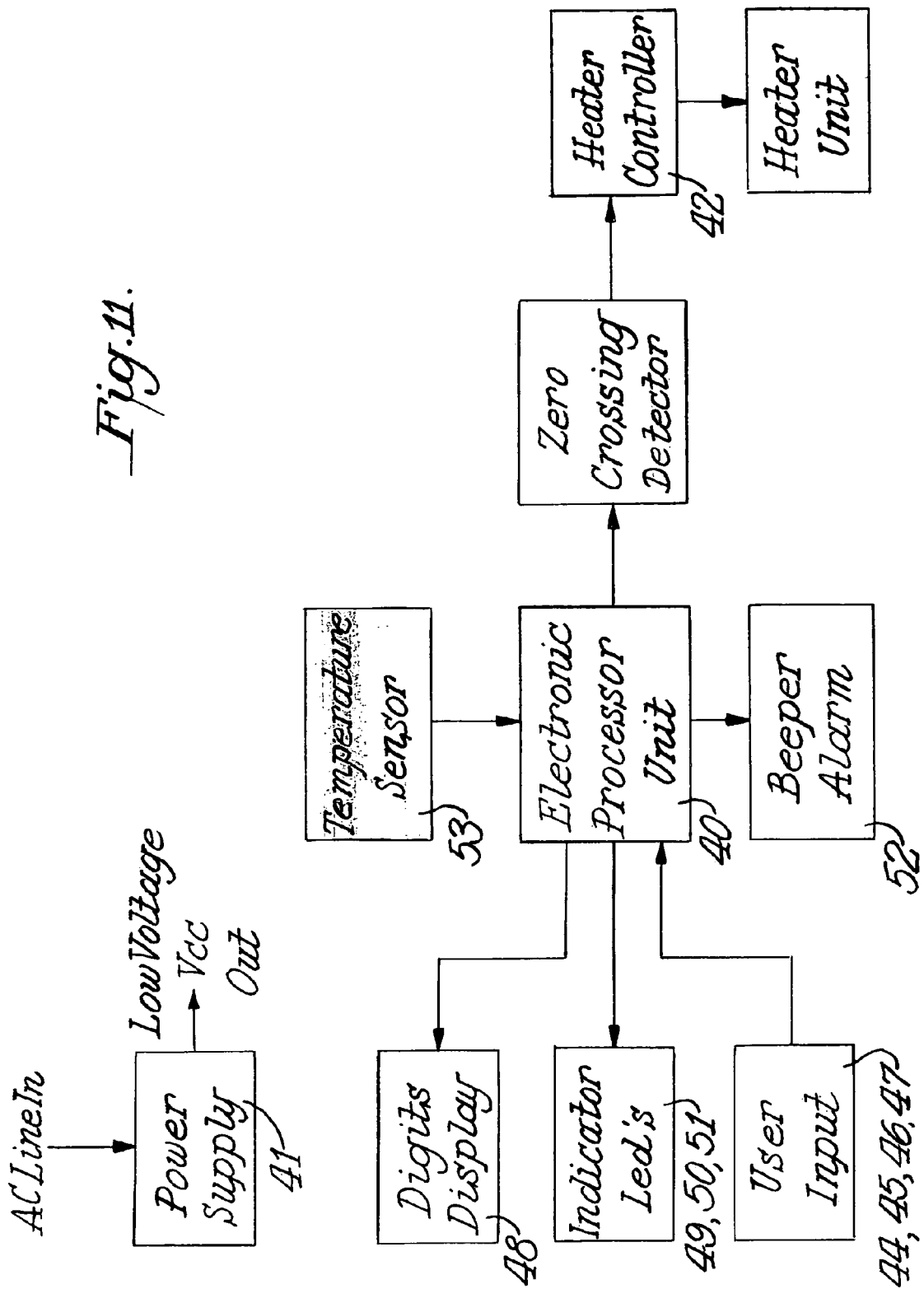

Fig. 14

WAFFLE MAKER

CROSS REFERENCE TO RELATED APPLICATION

This application is based on provisional application Ser. No. 60/660,358, filed Mar. 10, 2005.

STATEMENT REGARDING FEDERALLY SPONSORED RESEARCH OR DEVELOPMENT ("Not applicable")

BACKGROUND OF INVENTION (1) Field of Invention
This invention relates to waffle makers.
(2) Description of Related Art
One of the favorite household appliances is the waffle iron valued for its ability to create a variety of waffles for the entire family. The modern electric waffle maker design has gained rapid acceptance because of its ability to bake rapidly and to minimize the effort to clean-up.

Modern electric waffle makers commonly use thermostats to control the temperature of the heating plates and use indicator lights to signal when the plates are being heated or when their temperature has reached a selected starting temperature, ready for baking. Little attention has been given to flow patterns of the waffle batter as the lid is closed on the freshly poured batter. As a consequence this had led to uneven filling of the waffle pattern, wide variations in waffle thickness, and non-uniform baking, color, and texture of the finished waffle.

SUMMARY OF INVENTION

Novel improvements incorporated in the advanced waffle maker described here include controlled flow channels and unique venting means to insure that the steam generated during baking assists the flow of batter to fill waffle maker cavities uniformly, novel advanced electronic controls to insure precise baking temperatures, independent of baking time, automatic detection of the placement of waffle batter on the baking plates and adjustable independent control of the baking time.

THE DRAWINGS

FIG. 1 Is a perspective of waffle maker plates containing controlled venting along their perimeter.

FIGS. 2, 3, 4 & 5 Are detailed sections of molding along upper plate to control venting.

Figure 6A:
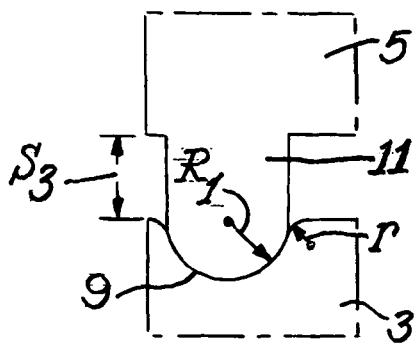

FIG. 6A Cross-section of upper and lower plate perimeters with total closure of venting.

Figure 6B:
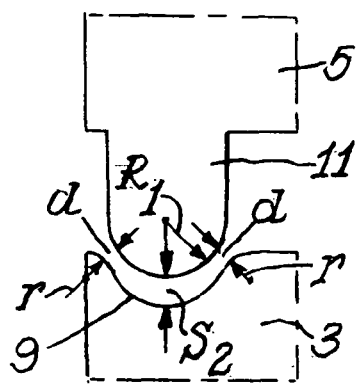

FIG. 6B Cross-section of 6A but shown in open position during baking.

Figure 6C:
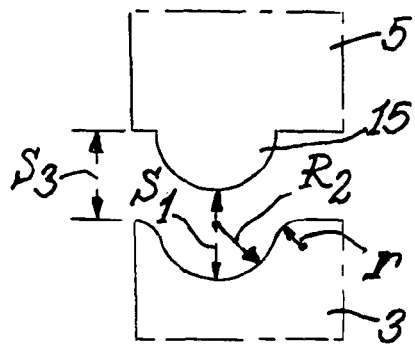

FIG. 6C Cross-section of a point on left perimeter of waffle plates showing a larger opening for venting, in closed position before baking.

Figure 7:
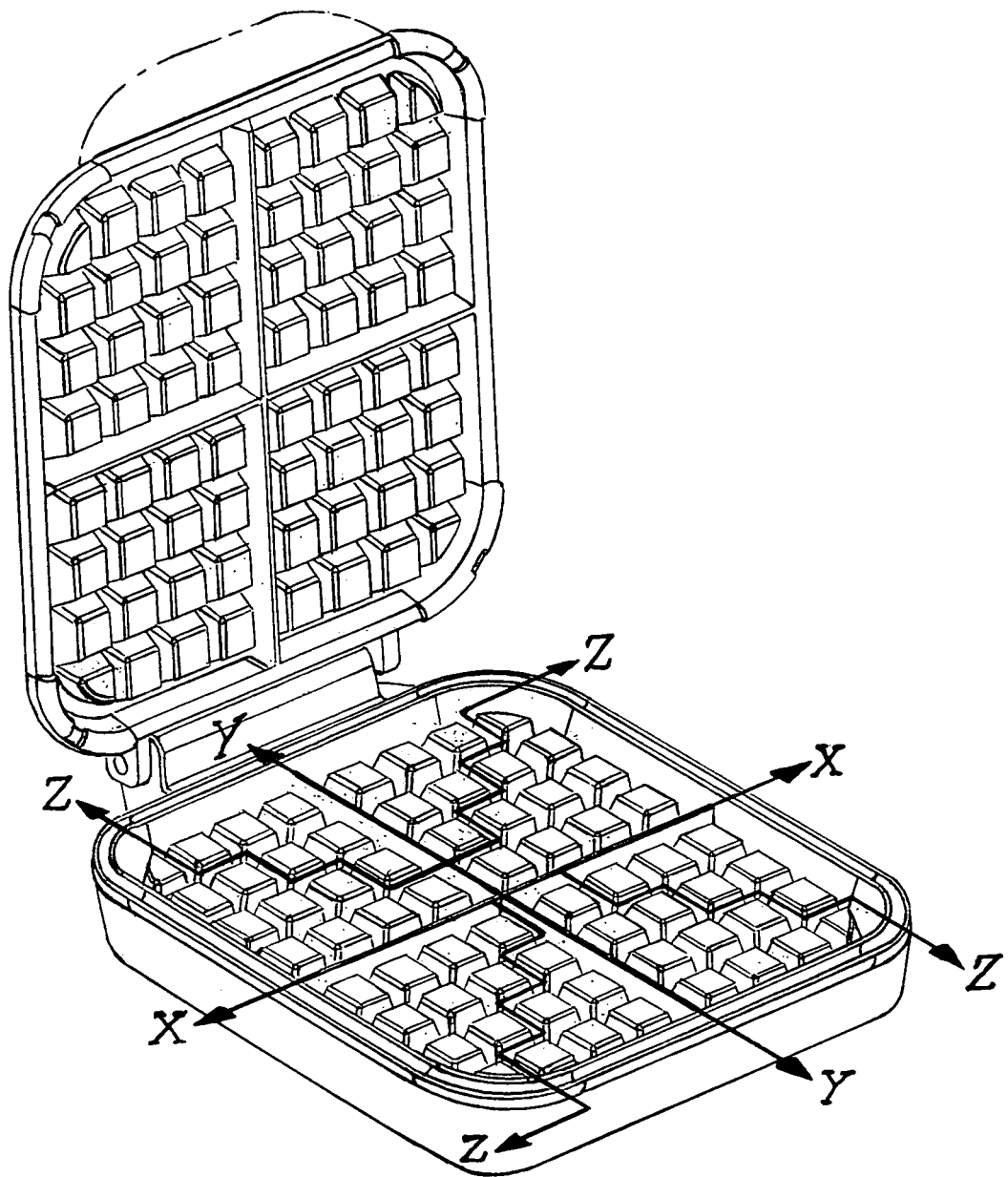

FIG. 7 Waffle plates of FIG. 1 showing paths of flow of waffle batter.

Figure 8:
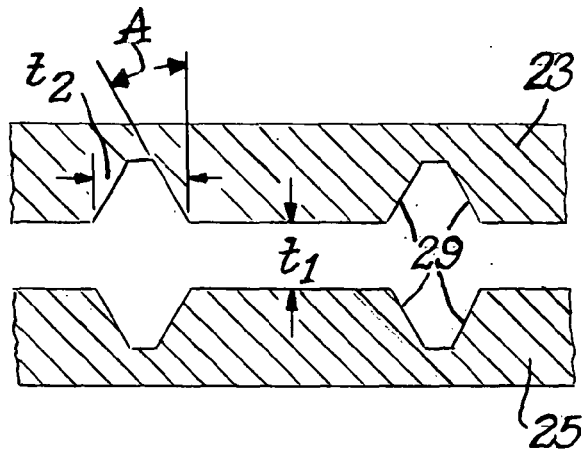

FIG. 8 Prior art cross-section of conventional waffle plates, enlarged.

Figure 9:
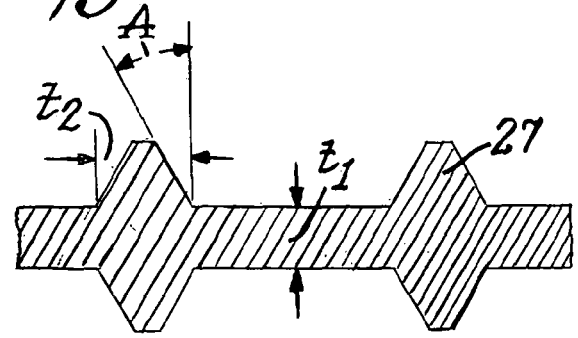

FIG. 9 Cross-section of waffle formed by baking in plates of FIG. 8.

Figure 10:
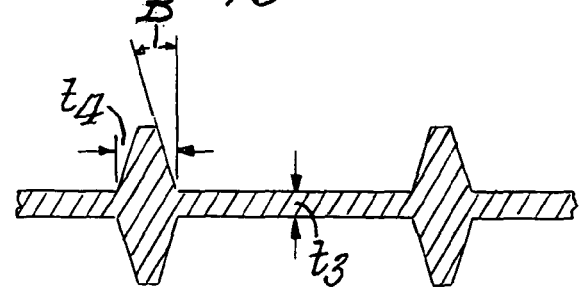

FIG. 10 Cross-section of waffle maker to create a lacier structure.

FIG. 11 Electronics—block diagram.

Figure 12:
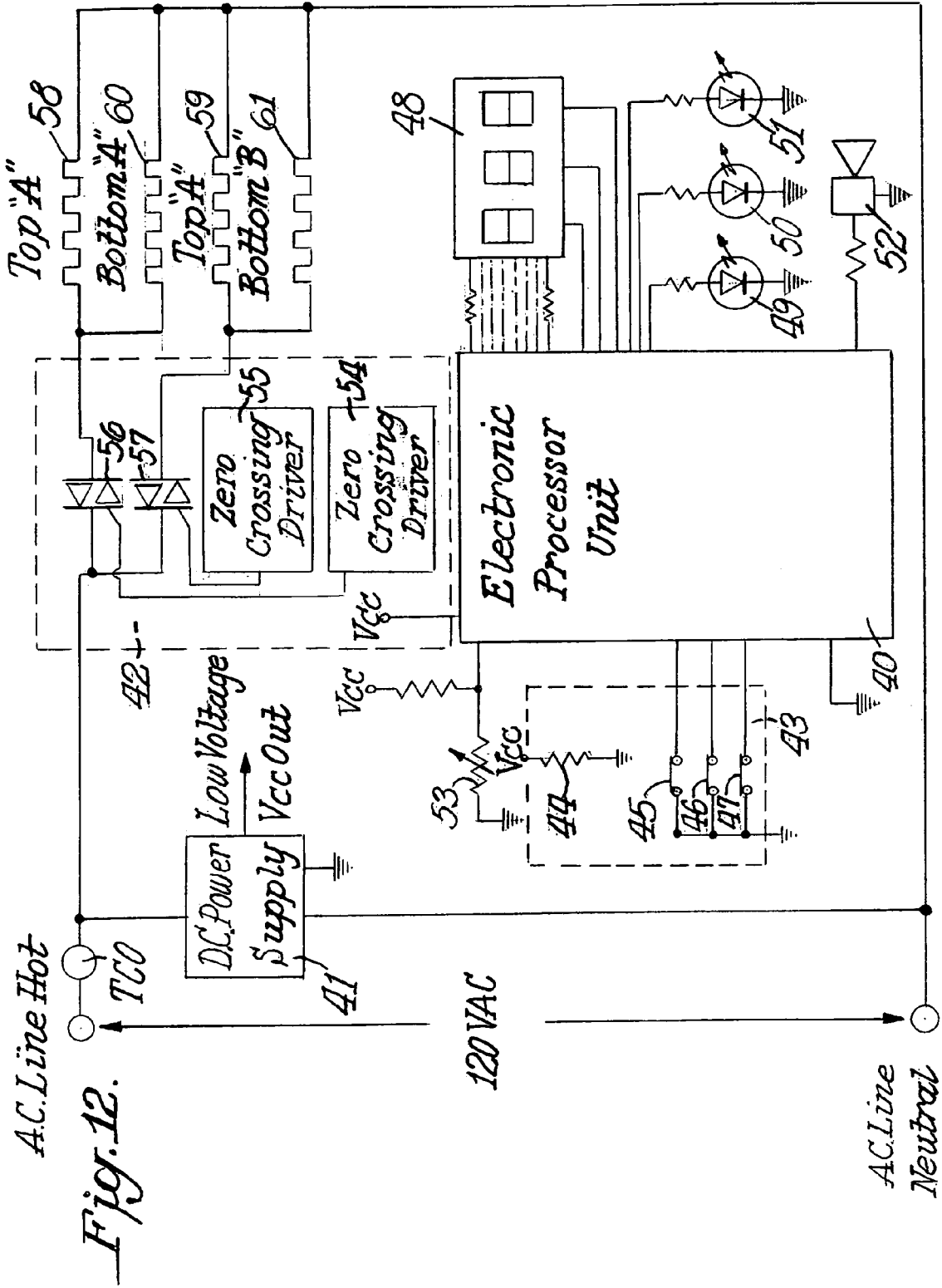

FIG. 12 Electronics—connections of components.

Figure 13:
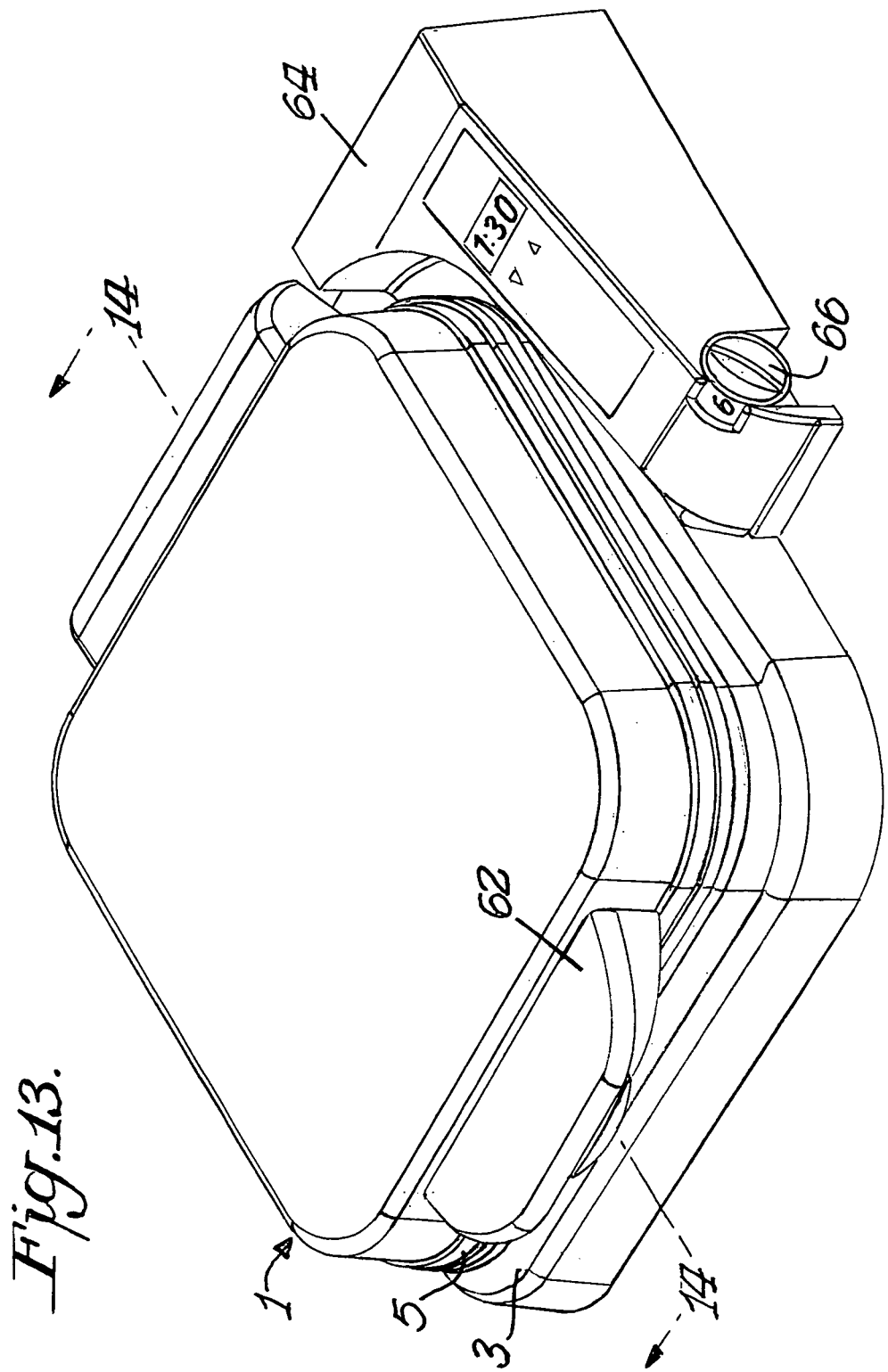

FIG. 13 Waffle maker of this patent.

Figure 14:
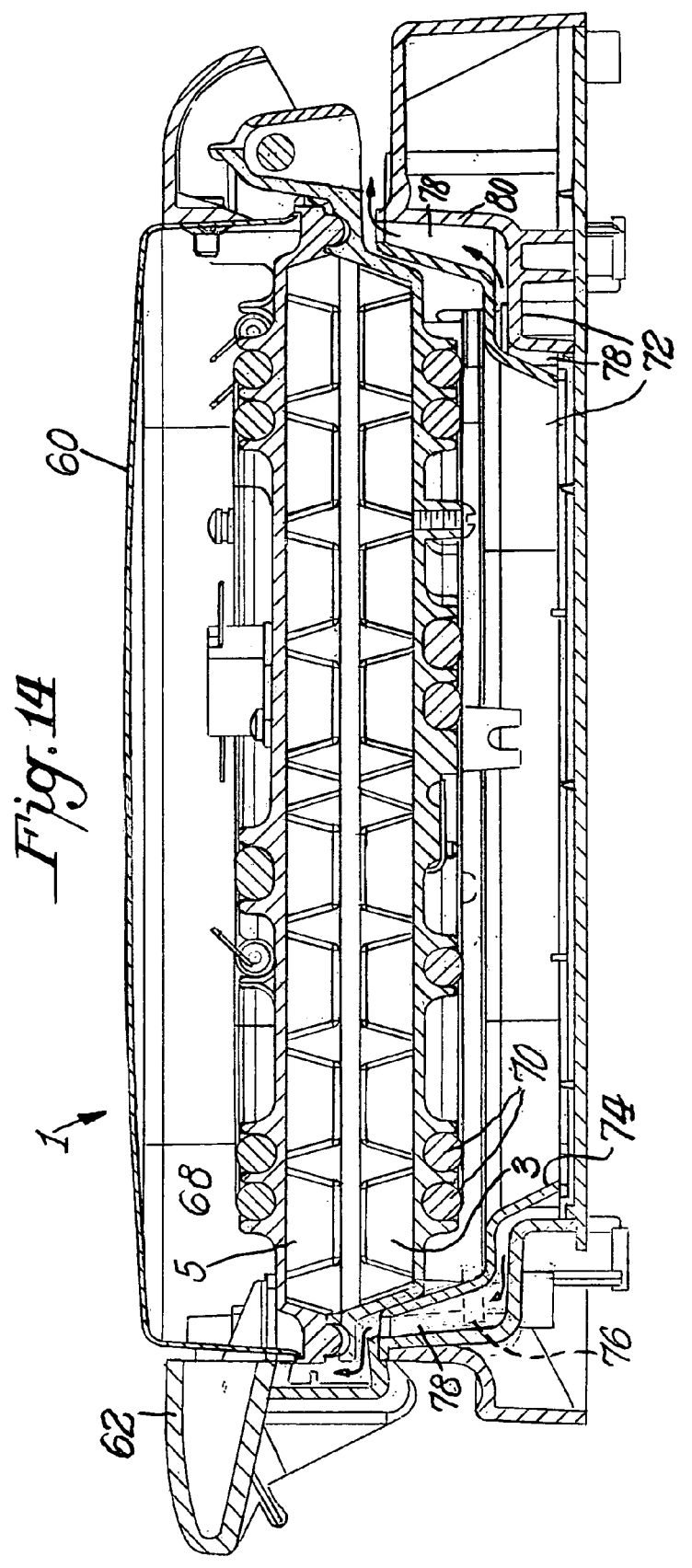

FIG. 14 Cross-section, left to right of waffle maker of this patent.

DETAILED DESCRIPTION

The improvements disclosed here insure exceedingly uniform waffle thickness and a fully filled pattern throughout the entire waffle, and uniform browning—(coloration) over the entire waffle surface. Means are provided to bake very rapidly for improved crispness on the waffle exterior while maintaining a moist interior, or alternatively the user can bake at lower power for a longer time to obtain a more uniform level of doneness throughout the waffle thickness for a more crunchy product.

The inventions disclosed here include:
a. Improved Design of the Waffle for Improved Taste and Texture.
b. Unique Venting System for Improved Distribution of Waffle Batter on waffle Plates.
c. Improved Operational Controls.
d. Advanced Electronic Circuitry.

A problem common to all previous waffle makers is that of distributing the waffle batter evenly across the waffle plates in a manner which insures that enough batter flows into each of the four corners to completely fill but not to overfill the pattern. Generally the batter is introduced manually onto the center of the lower heater waffle plate and is then spread out between the upper and lower plates as the upper plate is lowered into contact with the batter and the lower plate. Depending on the waffle pattern and shape of the baker, the flow of batter as it is spread by closing the waffle maker can be quite uneven and irregular leaving the corners or perimeter areas unfilled and at the same time creating undesirable and irregular overflow patterns of the batter at selected points along the perimeter of the heated plates. Such non-uniformity of the batter flow stimulated others to promote waffle makers that can be turned over (flipped) in an effort to obtain more uniform batter distribution and baking. These inventors have shown that flipping of the waffle maker is unnecessary in order to distribute the waffle batter evenly over the plates or to bake evenly.

The novel waffle plates developed by these inventors virtually eliminates such irregular flow patterns creating a uniformly filled and consequently a uniformly baked waffle. The unique means employed also controls unwanted high velocity steam emissions in areas around the perimeter of the baker that would otherwise threaten the human operators or the electronic control panels of a modern waffle maker.

Importantly it was discovered that these improvements made it possible to bake even very thick waffles much faster without the normally associative problems of excessive steam emission or an excessive or non-uniform physical "rise" of the waffle.

The majority of waffle makers have grid patterns that are rectilinear with the pattern lines running dominantly from the front of the waffle maker to the rear as from left to right in FIGS. 1 and 2. It is popular to divide the overall waffle into two or four easily individual segmented pieces as shown. In either of these designs the waffle sections are divided left/right and front/back. This type of sectioning of the waffle plates is very convenient for the user but the design creates non-uniform flow patterns of the waffle batter so that the batter does not fill some areas of the waffle while overflowing in other areas to the outside along the perimeter.

A waffle maker representative of one that incorporates the features described herein is shown, for example, in FIG. 13. The waffle maker 1 has a lid 60 that covers the upper waffle plate 5. In the closed position the upper plate rests on the lower plate 3. A handle 62 attached to the upper cover lid 60 is provided to raise the upper plate as necessary to add batter or to remove the baked waffle. The plates when open would resemble those of FIGS. 3 and 7.

The waffle maker shown, for example, in FIG. 13 has an electronics compartment 64 to house the electronic processing unit and associated controls. Manual controls on top of the electronics compartment are provided to increase or reduce the preset baking time, to select a fast bake or slow bake or to modify the bake temperature. Color Control knob 66 is provided to select the desired baking temperature for the waffle.

Improved Waffle Design for Improved Texture and Taste

Further it was discovered that exceedingly fine textured and flavorful deep waffles can be produced by uniquely tailoring the cross section of the waffle forming plate. The resulting waffle has an exceedingly light crispy nature even though it is an inch thick. It differs in this respect from conventional Belgian waffles which are thick and doughy.

Conventional deep waffle makers produce very deep waffles with a very thick wall structure. Because of their thickness these waffles are difficult to bake. First it takes many minutes—often 5 minutes to bake the thick batter all the way through their thickness. The resulting waffle is generally damp and doughy, hence not very appetizing unless eaten with other tasty condiments.

An object of these inventors is to produce a waffle that has a thin lacey nature, crispy with very little uncooked dough (batter) in the interior of the waffle. To accomplish this it was necessary to create a thin wall structure on all areas of the waffle.

The two waffle plates close to serve as a mold to create the waffle. FIG. 8 shows the cross section of a conventional pair of waffle plates 23 and 25 in the closed position. When batter is inserted between the plates the waffle 27, FIG. 9 is created. The waffle is essentially a duplicate of the mold cavity created by plates 23 and 25. Consequently the waffle is formed with its vertical ribs created at angle A and all dimensions such as $t_1$ for example are virtually identical in FIGS. 8 and 9.

As an example of the novel lacier design waffle, it has an unconventional horizontal web thickness $t_3$ (FIG. 10) of only 0.180 inch. This is very thin compared to a thickness $t_1$ of ¼ to ⅜ inch for the conventional one inch high Belgian type waffle. The vertical ribs of the lacier waffle likewise are thinner, with a width $t_4$ at their base, adjacent the horizontal web, of less than 0.3 inch. This compares to a width $t_2$, at base of the vertical rib, commonly about 0.4 to 0.5 inch for the conventional Belgian type waffle. The slope angle B of this novel lacier waffle is about 16° in order to maintain a thin vertical web at $t_2$. The typical slope angle A (FIG. 9) of a conventional Belgian type waffle would be on the order of 30 degrees.

The novel waffle created by these inventors is shown in FIG. 10 where the major thickness $t_3$ and $t_4$ as detailed above are much smaller than $t_1$ and $t_2$ of the conventional waffle of FIG. 9. To create this thinner waffle it is necessary to deviate from convention and mold the vertical ribs at angle B of approximately 16° instead of at the conventional larger angle almost twice as large. To mold successfully at this small angle, non-stick or highly polished surfaces are helpful to insure release of the cooked batter along the vertical surface 29 of the mold. The smaller the angle B the more difficult you would expect it would be to release the waffle from the plates as the waffle lid is raised. We found surprisingly that as the thickness of the waffle $t_4$, along these surfaces is decreased the more strength it has when baked and the more resistant it is to the shear forces involved as the plates are separated after the waffle is cooked. If this web $t_4$ is thick, the center of that web will be cooked less and it has little strength compared to the waffle structure immediately adjacent to the hot metal mold. Consequently but surprisingly it becomes easier to release without splitting or tearing the waffle if the web is thinner. Hence with a thinner web the angle B can be decreased. This is a fortuitous combination that makes possible the creation of a crispier, lacier waffle, with less doughy taste and texture.

Unique Venting System for Improved Distribution of Waffle Batter on Waffle Plates Waffle makers have historically been designed largely with rectilinear patterns on the waffle plates. There have been some decorative departures from the rectilinear patterns of FIG. 1, but in large the rectilinear patterns are most popular. Consequently the discussions here on novel means for filling the waffle pattern will be illustrated by reference to the rectilinear patterns. These patterns can be designed for single waffles, dual waffles or the so called 2×2 waffle such as FIG. 1 with four (4) waffle sections designed to be readily divided into four sections.

Waffle batters commonly are very thick, highly viscous mixtures composed of grain flours and minor ingredients such as leavening powders with water or milk. Their viscosity varies with the amount of liquid added. By adjusting the amount of liquid and leavening powders it is possible to vary the consistency of the resulting baked waffle from a more porous lighter consistency to a denser less airy structure according to individual preferences.

In any waffle maker the batter is sufficiently viscous to offer resistance to its flow across the waffle grid as it is forced to move across and along the patterned channels of the plates when the upper waffle plate is forced down against the batter confined between the heated plates and steam is generated. The plates are of course preheated before the batter is dropped onto them. There is a tendency for a thin layer of the batter to start baking immediately upon contact with the hot surface of the waffle plates. However, the bulk of the batter will remain flowable for seconds as the lid closes and the center core of the batter layer is forced to flow outwardly by the pressure of closing and to some degree by steam into the channels created for the waffle pattern. Batter will flow outward preferentially in those channels and directions that offer the least resistance to its flow according to hydrodynamic principles.

Upon contact with the waffle plates, heated for example to 350° F. substantially above the boiling point of water, some of the water in the batter contacting the plates will be immediately transformed to steam which will try to escape from the waffle maker by the path of least resistance. The amount of steam created exceeds the amount of water that can combine with the flour-like ingredients and hence that steam must be exhausted out of the waffle iron and to its exterior. As that steam moves along the pattern in the first seconds it will create small pathways for the excess steam's ultimate escape into the air outside the waffle iron. The batter will then continue to bake for one or more minutes during which time the remaining excess water exhausts along the small pathways.

Because of these flow mechanisms and the necessary exhaustion of excess steam the flow pattern of the batter can become very erratic during the cavity filling process leaving by preferred escape routes for the steam exhaustion while some areas of the waffle plate pattern are not filled evenly with batter. Some peripheral areas will receive no batter while other channels selectively serve as easy pathways for batter and steam to escape from the patterned plates to the outside. These mechanisms are complex but these inventors have found that by placing deliberate physical obstructions along the easier flow pathways or selectively along the perimeter of the patterns where steam or batter can otherwise easily exit, the batter can be forced to flow to all areas of the waffle plates including those areas reached only by longer and more indirect pathways that require greater pressure to force the batter there. Any pathway that requires the batter to make a turn, especially a 90° turn may not be filled unless obstructions are created along the more direct flow channels that offer resistance to added flow pressure in that direction and thereby aid the flow along less favorable flow-routes.

The effect of these flow mechanisms is obvious when one views a waffle made in conventional waffle irons. Some peripheral areas remain unfilled or partially filled even though substantial batter has flowed out of the waffle iron. In some cases the partially filled areas have a lighter partially-baked color. Some areas, especially along the perimeter of the waffle may still be white or uncolored reflecting the fact that steam which is cooler than the plates during part of the bake time has selectively exited across that area keeping it cooler and wetter than the bulk of the waffle and hence unbaked or not fully baked.

Obstruction can be placed in the way of batter flow either by selectively narrowing individual more direct flow pathways or by placing selective obstructions around the perimeter of the pattern. It is easier to obstruct the flow of batter than steam. Since in general, it is preferable to have a symmetrical waffle pattern, a recognizable pattern or attractive pattern, the preferred and novel method of adjusting the flow of batter and steam described here is to add the necessary selective obstructions or gates around the perimeter of the waffle plates. It is emphasized however that the barriers to batter flow and exits for steam must be located strategically around the perimeter and especially in corners of the waffle in order to create a full patterned waffle of uniform thickness.

The novel means developed by the inventors to insure uniform thickness and consequently uniform baking of the waffle is best described with the help of FIGS. 1 thru 7. FIG. 1 is a conventionally shaped waffle maker, 1. In use, liquid batter is ladled onto the central area of the lower waffle plate 3 preheated to an appropriate baking temperature, initially about 340° F.-380° F., well above the boiling point of water, 212° F. The upper heated plate 5, attached commonly by a hinge 7 the rear perimeter of the plate is then lowered over the batter compressing it by the weight of the lid and by any manually applied pressure or latching action during the closure process.

When the water laden batter is pressed by manually closing the lid and closing the latch it is forced to distribute and flow across the open channels in the waffle grid patterns. The batter is heated very rapidly where it contacts the very hot waffle plates. This heating creates chemical processes to occur within the batter which lock some of the water into the waffle chemistry but much of the water is instantly or quickly converted to a large volume of steam which will attempt to escape by means of the channels in the waffle plate patterns. The steam in conventional waffle makers may push some of the batter ahead of it along the channels as most of the steam escapes around the batter and through the batter particularly immediately adjacent to the hot surface of the waffle plates.

Excess waffle batter and the generated steam will take the path of least resistance to exit the waffle maker. If the waffle plates have rectilinear channels such as in FIGS. 1 and 7 the batter and steam will prefer to move in a straight line and exit near the middle of each side of the plates as illustrated in FIG. 7 along or parallel to lines X-X and Y-Y. Liquids and gasses prefer not to take the long route or to make right angle turns which inevitably are paths of greater resistance to flow. Viscous liquids in particular resist following abrupt changes in flow direction dictated by the channels.

As a consequence of the tendency of pressurized steam and batter to escape along the path of least resistance they will prefer to exit along lines X-X or Y-Y and not to take the devious route along paths Z (FIG. 7) to fill out the corners. Consequently waffle makers do not fill the pattern well in the corners and the resulting waffle geometry tends to be rounded in what should be square corners and hence it is usually unattractive and unevenly baked. The partially filled corner areas of the waffle plates are characteristically underbaked. This phenomena is exacerbated by the fact that some steam tends to collect in those unfilled corners because of its greater mobility and ability to make turns.

These inventors describe here how it is possible to avoid excessive flow of batter along directions X-X and Y-Y by restricting and tailoring the size of perimeter porting near the middle of the two sides and the front and back lines of the waffle plates. By restricting the batter flow in this manner the last portions of the flowing batter can be pressured to the corners of the plates along devious paths such as Z. Steam can be forced by means of such purposeful damming action and baking of the batter in slots along the more direct paths to seek its exit along lines Z. This action of the steam pushing batter ahead of it causes the batter to fill uniformly the corners of the waffle patterns, but is important to provide a favorable escape port in each corner for the steam—otherwise the steam will pocket there and can condense. It was found that with suitable, carefully sized, porting the waffle can be formed perfectly and the steam can escape without excessively wetting and cooling the batter, which can otherwise inhibit baking in these corners or in other steam exit areas. Wherever the steam is trapped or exiting of steam is uncontrolled, the waffle characteristically will not brown but instead be light or white in color.

These inventors found that by providing controlled venting around the perimeter of the waffle plates, it is possible to create waffles of surprisingly uniform thickness and color across the entire area of the waffle plates. That results in very uniform baking given uniform heating of the plates.

A preferred porting arrangement which was demonstrated to implement optimal flow of batter and steam across the plates and when needed to release residual steam is shown in FIGS. 1 through 7. FIG. 1 shows an open uniform channel 9 around the perimeter of the lower plate 3. The channel in the lower plate could for example be a half-cylindrical concave channel with a radius R of say ⅛ inch, that is a diameter of ¼ inch. To create controlled but varied porting around the perimeter of the closed waffle maker a similar but not uniform mating molding is created around the perimeter of the upper plate. The structure of the upper molding differs at various locations on the upper plate as indicated in FIG. 1. This upper molding at locations 11 has a convex full half cylindrical shape of a size matching the half-cylindrical concave channel 9 of the lower plate. When the plates are closed the convex molding at locations 11 on the upper plate fits snugly into and closes the concave channels 9 of the lower plate as shown in FIG. 6A. At other locations such as location 15 where partial escape of batter or steam is to be permitted even when the plates are fully closed at location 11, the upper convex molding has the same radius R but it is shortened to leave a gap—$S_1$ between it and the concave molding of the lower plate as shown in FIG. 6C. In practice it was found for example that the optimum amount of separations of the convex and concave moldings at points 13, 15, 17 and 19, with the plates empty and closed, varied from about 0.045 inch to about 0.100 inch. At the special steam ports 21 in the four corners FIGS. 2, 3, 4 and 5 the curved moldings were separated (in the closed lid condition) by a distance $S_1$ of only about 0.035 inch for a length of ⅛ to ¼ inch reflecting the fact that only a small port is needed to allow the low viscosity steam (gas) to escape. It was found that porting could be minimized beneficially in localized areas such as adjacent compartments housing electronics or adjacent handles where exiting of steam could damage electronic controls or otherwise create finger burns on lifting the lid when the baking is complete and the waffle must be removed. In the region of location 11 on the perimeter corners the convex molding on the upper place mated fully with the lower molding to provide total blockage of both batter and steam at these points when the upper lid is fully closed. However, as described later, when batter is placed between the plates, the upper plate will rise as the batter expands, but the amount of upper plate rise—$S_2$ is controlled and precisely limited by the precise latching mechanism. The amount of rise of the upper plate is limited in this waffle maker model by the latch to about 0.025-0.040 inch. As the upper lid rises and the plates separate, the perimeter molding at location 11 rises from its closed position of FIG. 6A to the slightly raised position as shown in FIG. 6B. Note, however that when the upper lid raises by an amount $S_2$, at position 11 (FIG. 6B) the slotted orifice created at d, FIG. 6B is substantially smaller than $S_2$, and in fact is only about one-half of the distance $S_2$. This means of controlling the localized venting of batter and steam lends itself to very precise control. To the extent that batter tries to escape out through small slots d during the early portion of the bake cycle, it is stopped or is slowed as it bakes at that location and ultimately reduces or blocks further leakage of batter and perhaps steam from that position on the perimeter. The height of the slot d will determine how much batter if any will exit at that location.

These inventors have shown that in order to control precisely the flow of batter and steam during the process of completely filling out the cavity between the waffle plates, to form a perfect appearing waffle, the design of the plate perimeter rims and the lid latch do play a critical and interrelated role. Waffle plates are commonly hinged along the rear perimeter of the plates and the hinge structure provides the most practical place to conceal the electrical conductor wires that connect to the heaters on the upper waffle plate. These wires must be shielded in a manner by the hinge structure to prevent wet batter from flowing into their channels within the hinge—otherwise clean up of the waffle maker becomes impractical. The hinged area must therefore be designed to provide such protection and the flow of batter and the release of steam in that region must be carefully controlled. Before batter is inserted and the hinged lid is lowered to the horizontal "closed" position the upper and lower waffle plates are fully "closed" at position 11 which establishes the minimum separation of the plates around the sides and front perimeter of the waffle plates. In the "closed" position a lid latch is engaged which is designed to allow only a fixed predetermined rise of the plates when batter is introduced. That initial minimum separation must be carefully established in order to create sufficient steam pressure after the cold batter is dropped onto the hot plates and the lid is pressed closed as the batter initially begins to bake. That initial steam pressure can be utilized to push the batter to the far regions of the plates instead of allowing it to simply escape along the shortest and easiest paths. If the waffle plates are designed with a latch that prevents any rise of the upper plate the generated steam pressure will be enormous during the initial portion of the bake cycle and the steam will move swiftly along the easy paths and exit as jets of steam. It can present a serious threat to anyone placing a hand near the perimeter of the waffle plates and much batter can be blown out of the waffle maker with the steam. By designing the latch so that it allows the upper waffle plate to lift but only a precisely controlled amount during the bake cycle as the batter naturally expands, due to internal creation of carbon dioxide and steam, the steam pressure can be moderated appropriately and used to push the batter to the extremities along all portions of the plates. As the viscous batter reaches the perimeter of the plates the opening between plates must be sufficiently small that the batter cannot escape readily but the opening between plates must in the appropriate areas be large enough to allow a controlled amount of steam to exit. The precise size of the opening—that is the separation of the plates at each point along the perimeter must be incorporated into the design of each plate. The latch mechanism must be designed to establish precisely the amount the upper plate can rise at the latch location. The plate perimeters must be designed to establish locally the plate separation needed to block exit of the batter but release just the right amount of steam.

Thus the optimum design of the waffle maker requires that the latching mechanism establish the correct amount of plate separation and that the perimeters of the plates be designed to hold in the batter until the waffle form is completely filled out yet allow excess steam to escape as necessary through narrow slots and designed ports along the perimeters.

The novel waffle plates described here when empty and closed were designed to contact each other physically at points 11 near the four corners as shown in FIGS. 1, 2, 3 and 4. The front latch was designed to allow the upper plate to rise on the order of 0.025-0.040 inch. As a consequence the front portions of the right and left perimeter area will rise during baking approximately this same amount—about 0.025-0.030 inch. An intentional linear gap when empty of about 0.100 inch between the plates was designed into the left perimeter and a smaller gap of 0.045 inch was designed along the back section of the right perimeter adjacent to the electronic controls. The rise of 0.025-0.040 inch allowed by the front latch during the bake cycle increases the left gap to about 0.125 to 0.145 inch and the back section of the right side to about 0.070 to 0.085 inch as the batter expands. The gap at the front portion of the right side (away from the electronics) was also about 0.100 inch when the waffle maker is empty and about 0.125 to 0.145 inch when baking.

We found in summary that the following openings along the perimeter of the waffle plates were optimum with an 8½×8½ inch square set of Belgian style waffle plates, 1 inch deep, powered at a total of either 1800 or 900 watts. The thickness of the horizontal waffle web was approximately 0.150 inch closed and 0.180 inch as baked with the lid latch controlling the maximum amount of rise of the upper plate.

|  | Minimum Separations $S_1$ With No Batter (inch) | Maximum Vertical Separations $S_1 + S_2$ At Maximum Rise of Upper Plate (inch) | Approximate Slot Width* d When Baking |
|---|---|---|---|
| Front Perimeter | 0.100 | 0.125-0.140 | 0.060 to 0.070 |
| Front Corners | 0.00 | 0.025-0.40 | 0.015 |
| Left Side Perimeter | 0.100 | Approx. .100-0.140 | .050 to 0.070 |
| Right Side, Front Section | 0.100 | Approx. 0.125-0.140 | 0.050 to 0.060 |
| Right Side Rearward Section | 0.045 | Approx. 0.050-.069 | 0.065 to 0.030 |
| Rear Corners | 0.00 | 0.000 | Approx. 0.000 |
| Rear Side Perimeter | 0.062 | 0.062 | 0.030 |
| Steam Vents, corners front | 0.035 | 0.060-0.075 | 0.037 |
| Steam Vents, corners rear | 0.035 | 0.035 | 0.035 |

*See FIGS. 6A, 6B and 6C for identity of slot width

The lid is hinged along the rear and hence the lid did not rise in the rear when baking. The front of the upper lid is allowed to rise as fixed amount in the range of 0.025 to 0.040 when baking as controlled by the latch design. The weighted average width of the slots during the baking cycle should be within the range of 15 to 40% of the thickness of the horizontal web of the waffle being formed depending on such factors as the volume of the waffle, the pattern of the waffle and how fast it is baked, that is the amount of power applied.

With this type of controlled porting the corners of each waffle filled well and reproducibly even when the amount of water in the batter varied widely and the waffle ingredients varied widely. It is impressive how uniform each successive waffle can be.

Without this sophisticated control of batter and steam flow, it has in the past been necessary to turn the waffle maker over (to flip it) physically in order to encourage a more uniform waffle fill and bake. This new means to control flow as described eliminates completely the need to turn over the waffle maker during baking. Thus the design of the waffle maker can be less complex and much smaller than the common "flip" style waffler.

The basic principle incorporated in the novel means described here to create uniform distribution of batter is to selectively restrict the exiting of batter and steam around the long sides of the waffle maker sufficiently to develop sufficient pressure to force batter to the corners of the plates with the help of the steam and then to allow the steam to exit the corners sufficiently so that it does not accumulate and block the flow of batter to the corners. The corners must be sufficiently blocked that batter will not easily exit there but provision must be made for the steam to exit.

Other physical means of controlling selectively the flow of batter and steam out of the sides and corners include means such as toothed slots spaced appropriately around the perimeter or placing physical blockage or restrictions within the areas of waffle pattern near their exit to the outside. Such alternative methods can affect the cosmetics of the waffle adversely unless it is done artistically. By selecting overall waffle patterns which are other than rectilinear the flow will also be modified favorably or adversely. The important differences in such patterns will be the flow lines to the distant corners. Of course the more circular the waffle pattern the easier it will be to control these flow patterns. With any pattern, the use of controlled and selective porting such as described here along the perimeter of the waffle plates can eliminate resulting non-uniformities in filling and variations in the thickness of the waffle.

Improved Operational Controls

The advanced waffle maker disclosed here has many advanced features and operational modes that insure better tasting, more uniform waffles, rapid or slow baking, and ability to select taste and texture to suit the individual user.

In operation, the user can select to bake with increased power (high wattage) or with less power (lower wattage). This permits in the first selection a faster bake and a waffle with increased crispness on the waffle surface and more moist in the interior. By selecting lower wattage baking is slower and a more uniform texture can be created throughout the thickness of the waffle.

To modify the texture and color, the operator can select an optimum baking temperature over the approximate range of 330-400° F. Separate and independent of temperature setting the user can select the baking time. The ability to independently select baking time and temperature provides greatest flexibility in the texture, color, and taste of the finished waffle.

In operation, when the waffle maker is plugged into the power outlet the electronic processing unit applies full power (all heaters) to heat the waffle plates rapidly. When the temperature of the plates rises to that desired bake temperature as established manually by setting the indexed "color control" knob, a green indicator light comes on indicating that the waffle maker is "ready" (at baking temperature) to bake. The timer that controls the baking cycle time sets automatically to its preset value, for example 90 seconds which is displayed visually. The operator lifts the lid (upper plate) and places a measured quantity of waffle batter onto the center of the lower waffle plate. A precise and sensitive thermal detector (temperature sensor) mounted under the lower waffle plate automatically senses the temperature drop caused by placing the colder waffle batter onto the heated lower plate and transmits that information to the electronic processing unit. The electronic processing unit waits to confirm the temperature drop then starts the baking timer which counts down and displays the time over the bake cycle to zero. The upper lid is closed promptly after the batter is placed on the lower plate and the waffle batter distributes evenly across the waffle plate surfaces and into their corners as described earlier. The operator can use manual controls provided to adjust and display the baking time with one second accuracy thus overriding any preset value.

In accordance with one aspect of this invention, a waffle maker with a pair of waffle plates is heated by electrical heaters with one or more heaters physically attached to each of the plates. A thermal sensing device is attached to at least one of the plates of the pair. An electrical controller regulates the power level to heat the plates in response to an electrical signal from the thermal sensing device responsive to the actual plate temperature as compared to a manually selected electrical reference signal known to correlate with plate temperature. The controller further processes the electrical signal from the thermal sensing device to detect rate of change of temperature when waffle batter is deposited on the one waffle plate and to then place full power on both waffle plates to begin baking the waffle batter.

When the baking cycle time is complete a beeper announces that it is time to remove the waffle. Automatic circuitry senses when the temperature of the waffle plates has fully recovered to the desired preset baking temperature (color contrast) and then indicates that the waffle maker is again "ready" to bake.

The waffle plates are heated by the selected power level of the heaters during baking and until such time that the plates return to the baking temperature. The power on the heaters is automatically reduced to a lower power level once the baking temperature is reached in order to maximize the accuracy of the temperature control at the manually selected baking temperature.

The operator can change the baking mode from fast to slow (full wattage or lower wattage) by manual push switches provided on the control panel. The baking time can likewise be selected by the operator by pushing the up or down button after the baking cycle is complete and before the next cycle.

The operation system will shut down—"go to sleep" after a pre-selected time if the waffle maker is not being utilized. It can be restarted simply by pressing any switch on the manual control panel. This is a valuable safety feature.

The electronic processing unit at all times monitors the integrity of the electrical circuits and components, and critical control elements such as the temperature sensor and if a fault or short circuit is detected it shuts down the power.

Advanced Electronic Circuitry

In accordance with an aspect of this invention, the upper and lower baking plates are each powered with at least one heating element for baking waffle batters applied manually to at least one of said plates. A temperature control unit maintains the plates before and after each baking cycle within a manually pre-selected temperature range. A manually adjustable timer controls the duration of the baking cycle, and a temperature sensing and control unit detects the temperature drop of at least one plate due to a placement of batter on at least one plate and measures the rate of temperature change of the at least one plate to initiate timing of the baking cycle.

FIG. 12 is an electrical diagram of the basic electrical operating components. FIG. 11 is a block diagram corresponding to FIG. 12. When AC line voltage power is applied to the unit, the DC power supply 41 will supply low voltage Vcc power to all necessary electronic control components. Initially the processor 40 has factory set default values stored for baking mode and baking time. The bake mode will be indicated by LED 51 if "fast", and LED 50 if "slow". The bake time will be displayed on digital display 48. If the user chooses to change time the time-up button 45 and/or the time-down button 46 is pressed and digital display 48 will show the new time set. Similarly the user may press the mode button 47 to change to the fast or slow default bake mode. After a waffle bake cycle, at these modified settings, the processor 40 will store these values for the next use. When the waffle maker is used again the modified values will be loaded even if the power has been removed. The processor 40 will determine the temperature of the baking plates from temperature sensor (thermal detector) 53 and if needed will energize heater controller 42 in order to supply heat to the plates in the following manner; the processor 40 will energize solid state zero crossing drivers 54 and 55 which will in turn energize triacs 56 and 57 which will supply line voltage to all top and bottom heaters 58, 59, 60 and 61. This novel fast heat method will ensure the minimum warm up time when the waffle maker is turned on regardless of which bake mode is selected. The processor 40 will then compare output from plate temperature sensor 53 with temperature set by manual "color" control 44 and when sensor 53 reaches "color" control 44 set temperature, the processor 40 will deactivate zero crossing drivers 54 and 55 thereby turning off all heaters. When set temperature is reached processor 40 will light "ready" LED 49 and sound beeper 52 once. At this point the processor 40 will monitor the difference between temperature sensor 53 and "color" control 44 set temperature and maintain set temperature in the following manner; the processor 40 will activate and deactivate zero crossing driver 54 many times in a time-based pulse-width modulation manner in order to reduce the effective power to the heaters 60 and 61 to only that sufficient to maintain set temperature. The zero crossing drivers 54 and 55 sense the location of the AC SINE wave voltage and only activate the triacs 56 and 57 when there is a zero voltage condition thereby reducing inrush current and eliminating radiated interference. Processor 40 will now monitor temperature sensor 53 for a rapid drop in temperature indicating the next batter being placed on plate.

When this drop is detected the processor 40 will turn off "ready" light 49, begin a count down timer and show remaining bake time on display 48, energize beeper 52 once and supply heat to the plates in the following manner: the processor 40 will energize zero crossing driver 54 and thereby triac 56 and thereby heaters 60 and 61 if in slow bake mode. It will energize zero crossing drivers 54 and 55 and thereby triacs 56 and 57 and thereby all heaters 58, 59, 60 and 61 if in fast bake mode. The unique use of zero crossing drivers and triacs eliminates the need for mechanical relays to control the power applied to the heaters. Mechanical relays are notorious for their lack of reliability and short life time under heavy current loads such as in the subject waffle makers with multiple heaters and fast bake times. When processor 40 determines set bake time has elapsed and the bake time display indication had reached "00" it will sound beeper 52 three times. Processor 40 will then monitor plate temperature via sensor 53 and actuate Ready to Bake light when temperature is fully recovered. Then as described above the processor will wait for additional rapid drops in temperature indicating start of another cycle. If processor 40 does not see a drop in temperature from sensor 53 for example 30 minutes or other such period it will turn off heater controller 42 and digital display 48 will show "---". Then, however pressing button 49 or 50 or 51 will resume normal operation. Processor 40 will also periodically check temperature sensor 53 for an electrically "shorted" or "open" condition. And if so will turn off heater controller 42 and display "ERR" on digital display 48. The AC line power must be turned off to reset this condition. If it cannot then be restarted there is an electrical failure and need for repair.

Unique Heat Baffling Member in Base of Waffle Maker

Because of the intense heat associated with waffle plates operating at the baking temperatures as high as 400° F., the design of waffle makers usually necessitates the use of high temperature plastics that can induce the excessive temperature involved. These inventors found however that better methods of cooling the plastic can reduce or eliminate the need for such exotic plastics, particularly in the base supporting member of the waffle maker. Referring to FIG. 14, a cross-sectioned view (left to right) of the subject waffle maker 1, the waffle plates 3 and 5 can be heated to temperatures in excess of 400 Fahrenheit. The temperature of these waffle plates and their electrical heaters 68 and 70 is far in excess of the softening temperatures of all but the most exotic molding plastics. It was found that a very thin light weight, hence inexpensive plastic baffling member 74 made of an exotic high temperature plastic could be designed to provide a conduit for cooling air around and inside the perimeter of the lower plastic supporting member 72 which can thermally isolate the very hot lower waffle plates 3 from the thermally sensitive plastic used for the balance of the supporting member 72 lower waffle plate. The light plastic baffle 74 molded of high temperature Ryton for example, supports a ceramic washer 76 that in turn supports the weight of the lower plate 3. A novel air passage 78 outward of exodic plastic baffle 74 but inside of the perimeter of the supporting base member allows cool room temperature air to move upward thru slot 78 around the perimeter of the waffle maker cooling the outside vertical wall 80 of the supporting member base which wall 80 is otherwise the hottest point on that supporting member of structure 72. This air flow reduces dramatically the temperature of the vertical wall 80 allowing the use of conventional plastics for the large supporting member 72.

What is claimed is:

1. A waffle maker comprising an upper baking plate and a lower baking plate, at least one heating element for each of said upper baking plate and said lower baking plate for baking during a baking cycle a waffle from batter placed between said upper baking plate and said lower baking plate, a timer to control a preset duration of time of the baking cycle at full power for that baking cycle, a temperature control for setting the heating temperature of said baking plates, a thermal detector attached to said lower baking plate for detecting a temperature drop of said lower baking plate which is indicative of a drop in temperature resulting from placing on said lower baking plate waffle batter which is colder than said lower baking plate, an electronic processing unit and circuitry operatively connected to said temperature control and to said heating elements and to said timer and to said thermal detector, said electronic processing unit monitoring the difference in temperature sensed by said thermal detector and the set temperature of said temperature control to maintain said lower baking plate at the set temperature, said electronic processing unit monitoring said thermal detector for a drop in temperature and to detect a rate of temperature change indicative of waffle batter being placed on said lower baking plate, and for said electronic processing unit upon said detection of said rate of temperature change indicative of the drop in temperature initiating start of said timer and for said circuitry applying full power for the baking cycle to said heating elements whereby the placement on said lower baking plate of waffle batter which is colder than said lower baking plate is detected and timing of the baking cycle is initiated.

2. The waffle maker of claim 1 wherein each of said upper and lower baking plates has a recessed waffle forming surface, said plates having a closed waffle baking condition with said waffle forming surfaces disposed toward each other, each of said waffle forming surfaces having a raised pattern of spaced metallic projections to act as a mold which in combination result in the waffle being formed between said surfaces with the formed waffle thereby having thin vertical and horizontal ribs that join to form pockets, said waffle forming surfaces of said plates being spaced apart in said closed position to create an overall spacing between said recessed waffle forming surfaces on the order of one inch and to create vertical and horizontal waffle ribs which are less than 0.3 inches thick with the vertical ribs of the waffle being at an angle of less than 20°.

3. The waffle of claim 2 including a latching structure connecting said upper baking plate to said lower baking plate in such a manner that allows but limits said upper plate to rise only a predetermined amount when said plates are in said closed baking position to thereby limit the maximum thickness of the horizontal ribs of the waffle.

4. The waffle maker of claim 1 including latching structure connecting said upper and lower baking plates to each other to restrict the amount of separation of said upper plate from said lower plate when said plates are in a waffle baking and forming position, said upper and lower baking plates having recessed waffle forming surfaces which are disposed toward each other in said waffle baking and forming position, said recessed waffle forming surface of each of said plates having a pattern of spaced metallic projections to act as a mold which in combination create the waffle therebetween which has a complementary shape with horizontal ribs, said latching structure restricting the amount of added separation during baking to less than 50% of the thickness of the horizontal ribs, each of said waffle baking plates having a perimeter molding and/or cooperating structure to create slotted exhaust ports of varying width "d" at different locations along the perimeter of said waffle baking plates whereby the flow of excess waffle batter and steam is controlled to flow to the exterior of said waffle maker only through said perimeter exhaust ports.

5. The waffle maker of claim 4 wherein the width "d" of said perimeter exhaust ports has a weighted average when baking which is within the range of 15 and 40% of the thickness of the horizontal web of the waffle being created by the total spacing between said waffle forming surfaces.

6. The waffle maker of claim 1 wherein each of said waffle baking plates has a waffle forming surface disposed toward each other when said baking plates are in a waffle baking position, each of said waffle forming surfaces having a surface pattern to act as a mold which in combination create a baked waffle with thin vertical walls with vertical sides and thin horizontal webs with the angle of the vertical sides of the vertical walls being less than 20° and with the walls at their base having a thickness less than 0.3 inch and the horizontal webs having a thickness less than 0.2 inch whereby an amount of material being baked in the baked waffle is decreased and has a crispier texture to reduce the amount of contiguous interior waffle material remaining in an un-browned condition in the baked waffle.

7. The waffle maker of claim 1 wherein said lower baking plate is supported by an injection molded thermoplastic supporting member made of a plastic with a softening temperature less than a predetermined baking temperature, said supporting member having an outer perimeter, a nominally vertically mounted air baffling member within said outer perimeter and made of a material capable of withstanding a predetermined baking temperature to create a conduit for ambient cooling air to enter between said baffling member and said outer perimeter of said supporting member and to direct cooling air to exhaust between a perimeter of said lower baking plate and said outer perimeter of said supporting member to thereby protect said supporting member from excessive heat from said lower baking plate.

8. The waffle maker of claim 1 wherein said timer is manually adjustable.

9. The waffle maker of claim 1 wherein each of said at least one heating element comprises two individually powered heaters, said thermal detector sensing the completion of the baking cycle upon return of the temperature of said lower baking plate to a pre-selected baking temperature, and said processing unit terminating full power to both of said baking plates and modulating the power applied to only one of said two heaters on each baking plate in order to more precisely control the temperature at a preselected level while minimizing deviation from that temperature.

10. The waffle maker of claim 9 wherein said processing unit modulates the power applied to one of said heaters by selectively activating and deactivating a zero crossing driver to apply power only for short time intervals in a time based modulated manner to reduce power applied to said heaters and to more precisely hold plate temperature swings within a narrow temperature range.

11. The waffle maker of claim 1 wherein said processor unit adjusts and regulates the power level to heat said baking plates in response to an electrical signal from said thermal detector responsive to an actual baking plate temperature as compared to a manually selected electrical reference signal which correlates with the baking plate temperature, and said processor unit further processing the electrical signal from said thermal detector to detect a rate of change of the temperature decrease on said lower baking plate and to verify the continuation of a detected decrease by a second determination of the rate of baking plate temperature decrease of said lower baking plate before actuating said heating elements to full power.

12. The waffle maker of claim 11 including a visual display of a manually selected baking time for said timer, said visual display being responsive to said processor unit to terminate the display of the selected total bake time cycle and to initiate a count down of the remaining baking time starting immediately when said processor unit verifies by the second determination of the continuation of the rate of plate temperature decrease.

13. The waffle maker of claim 1 wherein said at least one heating element of each of said baking plates comprises an electrical heater which is part of a control system having electrical circuits and components for baking the waffle from the batter placed between said baking plates, said control system including said thermal detector, and said processor unit periodically monitoring electrical integrity of said electrical circuits and said components and said thermal detector in said control system to search for faults in said system and to turn off the power to said electrical heaters upon detection of any of the faults.

14. The waffle maker of claim 1 including a heat control system comprising at least one zero crossing driver and at least one triac heater controller, and said processor unit operatively connected to said heat control system to control the electrical power applied to said at least one heating element in response to a signal from said thermal detector by selectively energizing and deactivating said at least one zero crossing driver which activates said at least one triac to selectively deliver or to reduce or to turn off power to said at least one heating element.

15. The waffle maker of claim 1 wherein said temperature control is a manual temperature control.

* * * * *